(12) United States Patent
Furuta et al.

(10) Patent No.: US 11,614,533 B2
(45) Date of Patent: Mar. 28, 2023

(54) RADAR SIGNAL PROCESSING DEVICE, RADAR DEVICE, AND RADAR SIGNAL PROCESSING METHOD

(71) Applicant: Mitsubishi Electric Corporation, Tokyo (JP)

(72) Inventors: Tetsuro Furuta, Tokyo (JP); Hiroshi Sakamaki, Tokyo (JP); Teruyuki Hara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 237 days.

(21) Appl. No.: 16/771,605

(22) PCT Filed: Dec. 15, 2017

(86) PCT No.: PCT/JP2017/045140
§ 371 (c)(1),
(2) Date: Jun. 10, 2020

(87) PCT Pub. No.: WO2019/116548
PCT Pub. Date: Jun. 20, 2019

(65) Prior Publication Data
US 2020/0301003 A1 Sep. 24, 2020

(51) Int. Cl.
*G01S 13/60* (2006.01)
*G01S 13/42* (2006.01)
*G01S 13/931* (2020.01)

(52) U.S. Cl.
CPC .............. *G01S 13/60* (2013.01); *G01S 13/42* (2013.01); *G01S 13/931* (2013.01)

(58) Field of Classification Search
CPC .......... G01S 13/60; G01S 13/42; G01S 13/931
See application file for complete search history.

(56) References Cited

U.S. PATENT DOCUMENTS

| | | | | |
|---|---|---|---|---|
| 7,924,215 | B2* | 4/2011 | Nakanishi | G08G 1/167 342/107 |
| 8,068,134 | B2* | 11/2011 | Yoshizawa | G06V 20/58 348/148 |
| 2011/0074622 | A1* | 3/2011 | Shibata | G01S 13/726 342/90 |
| 2011/0221628 | A1 | 9/2011 | Kamo et al. | |

FOREIGN PATENT DOCUMENTS

JP 2012-018058 A 1/2012

OTHER PUBLICATIONS

D. M. Grimes and T. O. Jones, "Automotive radar: A brief review," in Proceedings of the IEEE, vol. 62, No. 6, pp. 804-822, Jun. 1974, doi: 10.1109/PROC.1974.9520. (Year: 1974).*
International Search Report for PCT/JP2017/045140 dated Feb. 20, 2018 (PCT/ISA/210).

* cited by examiner

*Primary Examiner* — Vladimir Magloire
*Assistant Examiner* — Yonghong Li
(74) *Attorney, Agent, or Firm* — Sughrue Mion, PLLC; Richard C. Turner

(57) ABSTRACT

A collision determining unit (404) determines whether a vehicle (1000) collides with an object (1001) when a Doppler velocity component between the vehicle (1000) and the object (1001) varies to a first reference value, or when the vehicle (1000) has traveled to a range R corresponding to the first reference value.

9 Claims, 14 Drawing Sheets

RADAR SIGNAL PROCESSING DEVICE, RADAR DEVICE, AND RADAR SIGNAL PROCESSING METHOD

CROSS REFERENCE TO RELATED APPLICATIONS

This application is a National Stage of International Application No. PCT/JP2017/045140 filed Dec. 15, 2017.

TECHNICAL FIELD

The present invention relates to a radar signal processing device and a radar device and a radar signal processing method using the radar signal processing device.

BACKGROUND ART

Conventional in-vehicle radars have low accuracy of angle measurement in the height direction, and thus there are cases where upper structures (e.g. signs, viaducts, street trees, etc.) that are sufficiently higher than the height of a vehicle (higher than or equal to 4.5 m) are erroneously detected as objects on a roadway. Meanwhile, for example in a radar device described in Patent Literature 1, an upper structure is determined using, as a reference, a first null point of an antenna directivity pattern. The first null point refers to an elevation angle at which the reception sensitivity of the antenna becomes 0 between the main lobe and a first side lobe of the antenna. The radar device described in Patent Literature 1 estimates the height of an object to be detected using the fact that the distance from a vehicle to the first null point generated in the antenna directivity pattern is proportional to the height of an object to be detected.

CITATION LIST

Patent Literatures

Patent Literature 1: JP 2012-18058 A

SUMMARY OF INVENTION

Technical Problem

In the radar device described in Patent Literature 1, however, it is necessary to approach the object to be detected until the first null point is generated in the antenna directivity pattern, and thus there is a disadvantage that it takes time to determine whether the object to be detected is an upper structure.

For example, when the height of the object to be detected is low, the first null point is not generated in the antenna directivity pattern unless the radar device sufficiently approaches the object. For this reason, the radar device described in Patent Literature 1 cannot estimate the height of the object until the first null point is generated in the antenna directivity pattern.

In addition, the radar device described in Patent Literature 1 determines the first null point by simulation with assumption that the number of objects to be detected is one.

However, in an actual environment, there are cases where it is difficult to accurately obtain a first null point since waveforms of signal waves reflected from a plurality of objects are overlapped.

In this case, the estimation accuracy of the height of an upper structure in the radar device described in Patent Literature 1 is deteriorated.

The present invention solves the above disadvantage, and an object of the invention is to provide a radar signal processing device, a radar device, and a radar signal processing method capable of accurately and promptly performing collision determination between a vehicle and an object above.

Solution to Problem

A radar signal processing device according to the present invention includes a Fourier transform unit, a peak detection unit, an azimuth detection unit, an object position determining unit, and a first collision determining unit. The Fourier transform unit generates an FR map in which the relative distance and the relative velocity between a vehicle and an object are associated with the signal intensity level of a reception signal by performing Fourier transform on a reception signal of a radio wave transmitted to the vicinity of the vehicle and reflected from an object. The peak detection unit detects a peak of the signal intensity level on the basis of the FR map generated by the Fourier transform unit. The azimuth detection unit detects the azimuth of the object on the basis of the detection information of the peak of the signal level detected by the peak detection unit. The object position determining unit determines whether the object is present at a position in the travelling direction of the vehicle on the basis of the detection information of the azimuth detected by the azimuth detection unit. The first collision determining unit determines whether the vehicle collides with the object determined to be present at the position in the travelling direction of the vehicle by the object position determining unit on the basis of data indicating a correspondence relationship between a traveling velocity of the vehicle and a relative distance between the vehicle and the object present at a position away in a direction perpendicular to the travelling direction of the vehicle at the time when an amount of variation in a Doppler velocity component of the vehicle with respect to the object present at the position away in the direction perpendicular to the travelling direction of the vehicle has reached a first reference value, or when the vehicle has traveled to a distance corresponding to the first reference value.

Advantageous Effects of Invention

According to the present invention, the radar signal processing device determines whether a vehicle collides with an object when a Doppler velocity component between the vehicle and the object varies to a first reference value or when the vehicle travels to a distance corresponding to the first reference value. As a result, the radar signal processing device can accurately and promptly perform collision determination between the vehicle and an object above.

DESCRIPTION OF EMBODIMENTS

To describe the present invention further in detail, embodiments for carrying out the invention will be described below with reference to the accompanying drawings.

First Embodiment

Figure 1:
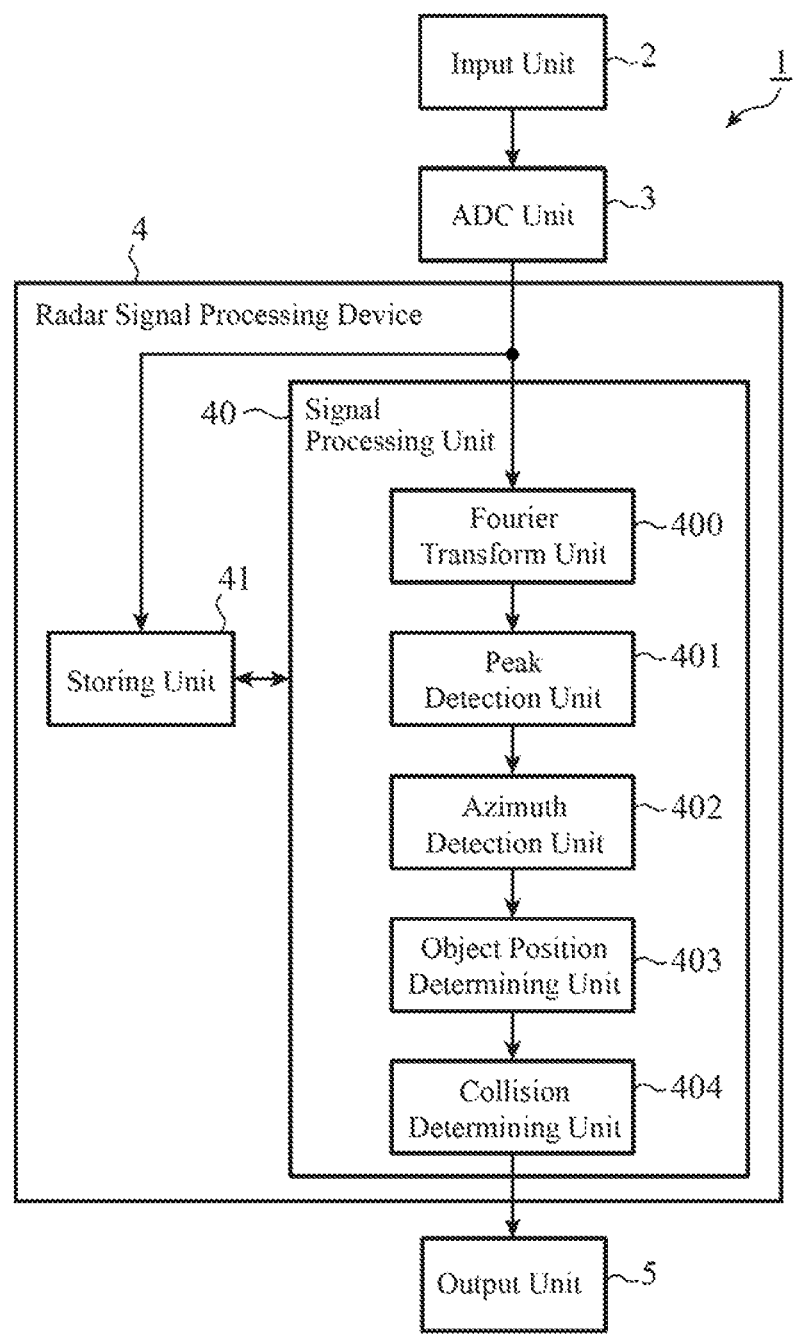
FIG. 1 is a block diagram illustrating a configuration of a radar device according to a first embodiment of the invention.

FIG. 1 is a block diagram illustrating a configuration of a radar device 1 according to a first embodiment of the invention. The radar device 1 is an in-vehicle radar, and detects the positional relationship between a vehicle and an object present around the vehicle. As illustrated in FIG. 1, the radar device 1 includes an input unit 2, an analog-digital converter (ADC) unit 3, a radar signal processing device 4, and an output unit 5.

The input unit 2 receives a radio wave transmitted to the vicinity of the vehicle and reflected from an object. For example, the input unit 2 can be implemented by a reception antenna that receives a radio wave transmitted to the vicinity of the vehicle from a transmission antenna, reflected by an object, and arriving at the radar device 1.

The ADC unit 3 converts the analog signal of the radio wave received by the input unit 2 into a digital signal by sampling at a preset sampling frequency.

The radar signal processing device 4 determines whether the vehicle collides with the object around the vehicle on the basis of a result of signal processing of the digital signal input from the ADC unit 3. The radar signal processing device 4 includes a signal processing unit 40 and a storing unit 41 as its components. The signal processing unit 40 includes a Fourier transform unit 400, a peak detection unit 401, an azimuth detection unit 402, an object position determining unit 403, and a collision determining unit 404.

The output unit 5 outputs a determination result of whether the vehicle collides with the object by the radar signal processing device 4. For example, a determination result that the vehicle may collide with the object is output to a vehicle velocity control device that controls the traveling velocity of the vehicle. The vehicle velocity control device controls the vehicle velocity on the basis of the determination result input from the output unit 5 so that the vehicle does not collide with the object.

The signal processing unit 40 in the radar signal processing device 4 is a component that determines whether the vehicle collides with the object around the vehicle on the basis of the result of signal processing of the digital signal input from the ADC unit 3. The storing unit 41 stores a reception signal converted into a digital signal by the ADC unit 3. The storing unit 41 also stores table data indicating the correspondence relationship between the velocity of the vehicle and the relative distance (hereinafter referred to as the range) between the vehicle and an object present at a position apart from the vehicle in a direction perpendicular to the traveling direction of the vehicle.

The Fourier transform unit 400 generates a frequency-range map (hereinafter referred to as the FR map) by performing Fourier transform on the reception signal input from the ADC unit 3 in the range direction and the Doppler velocity direction. The FR map is a two-dimensional map in which the relative distance and the relative velocity between a vehicle and an object are associated with the signal intensity level of a reception signal (hereinafter referred to as a signal level).

The peak detection unit 401 detects a peak of the signal level on the basis of the FR map generated by the Fourier transform unit 400. For example, the peak detection unit 401 uses a constant false alarm rate (CFAR) to detect a signal level exceeding a threshold value in the FR map. The peak of the signal level exceeding the threshold value indicates that an object is present around the vehicle.

The detection information of the peak of the signal level detected by the peak detection unit 401 is output to the azimuth detection unit 402.

The azimuth detection unit 402 detects the azimuth of the object on the basis of the detection information of the peak of the signal level detected by the peak detection unit 401.

For example, the azimuth detection unit 402 performs incoming direction estimation processing using a correlation matrix and an eigenvector of the reception signal on the basis of the detection information of the peak of the signal level to calculate the eigenvalue of the correlation matrix. The azimuth detection unit 402 estimates the number of incoming waves on the basis of the number of eigenvalues larger than the power of thermal noise, and detects the azimuth of the object on the basis of the estimated number of incoming waves. The MUSIC method or the ESPRIT method may be used for estimation of the azimuth of the object.

Information regarding the azimuth of the object detected by the azimuth detection unit 402 is output to the object position determining unit 403 and is further stored in the storing unit 41.

The object position determining unit 403 determines whether the object is at a position in the travelling direction of the vehicle on the basis of the detection information of the azimuth of the object detected by the azimuth detection unit 402.

For example, the object position determining unit 403 determines, from among objects present around the vehicle, an object present at a position having a distance from the vehicle in the traveling direction within a certain value as an object present at a position where there is a possibility of collision with the vehicle.

The collision determining unit 404 is a first collision determining unit for determining whether the vehicle collides with the object determined by the object position determining unit 403 to be present at a position in the travelling direction of the vehicle. For example, the collision determining unit 404 determines whether the vehicle collides with the object on the basis of data indicating the correspondence relationship between the velocity of the vehicle and the range between the object and the vehicle at the time when the amount of variation of a Doppler velocity component of the vehicle with respect to the object present at a position away in a direction perpendicular to the traveling direction of the vehicle has reached a first reference value, or when the vehicle has traveled to a distance corresponding to the first reference value. The first reference value is a reference value for the amount of variation in the Doppler velocity component of the vehicle with respect to the object. When the Doppler velocity component varies by the first reference value, a range corresponding to the velocity of the vehicle at that time can be determined.

Figure 2A:
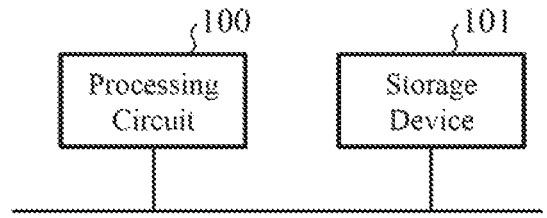
FIG. 2A is a block diagram illustrating a hardware configuration implementing the function of a radar signal processing device according to the first embodiment.
Figure 2B:
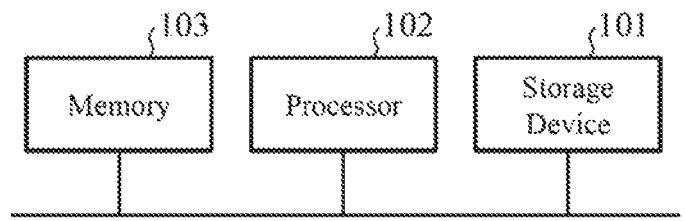
FIG. 2B is a block diagram illustrating a hardware configuration for executing software that implements the function of the radar signal processing device according to the first embodiment.

FIG. 2A is a block diagram illustrating a hardware configuration for implementing the function of the radar signal processing device 4. Meanwhile, FIG. 2B is a block diagram illustrating a hardware configuration for executing software that implements the function of the radar signal processing device 4. The storing unit 41 illustrated in FIG. 1 is implemented by the storage device 101 illustrated in FIGS. 2A and 2B.

The functions of the Fourier transform unit 400, the peak detection unit 401, the azimuth detection unit 402, the object position determining unit 403, and the collision determining unit 404 in the radar signal processing device 4 are implemented by a processing circuit. In other words, the radar signal processing device 4 includes a processing circuit for executing each of multiple steps of processing in the flowchart illustrated in FIG. 3 as described later.

The processing circuit may be dedicated hardware or a central processing unit (CPU) that executes a program stored in a memory.

In a case where the processing circuit is dedicated hardware illustrated in FIG. 2A, the processing circuit 100 corresponds to, for example, a single circuit, a composite circuit, a programmed processor, a parallel programmed processor, an application specific integrated circuit (ASIC), a field-programmable gate array (FPGA), or a combination thereof.

In the case where the processing circuit is the processor 102 illustrated in FIG. 2B, each function of the Fourier transform unit 400, the peak detection unit 401, the azimuth detection unit 402, the object position determining unit 403, and the collision determining unit 404 in the radar signal processing device 4 are implemented by software, firmware, or a combination of software and firmware. The software or the firmware is described as a program and is stored in the memory 103.

The processor 102 reads out and executes the program stored in the memory 103 and thereby implements each function of the Fourier transform unit 400, the peak detection unit 401, the azimuth detection unit 402, the object position determining unit 403, and the collision determining unit 404 in the radar signal processing device 4. That is, the radar signal processing device 4 includes the memory 103 for storing programs execution of which by the processor 102 results in execution of the series of processing illustrated in FIG. 3. These programs cause a computer to execute the procedures or methods of the Fourier transform unit 400, the peak detection unit 401, the azimuth detection unit 402, the object position determining unit 403, and the collision determining unit 404.

The memory 103 corresponds to a nonvolatile or volatile semiconductor memory such as a random access memory (RAM), a read only memory (ROM), a flash memory, an erasable programmable read only memory (EPROM), or an electrically-EPROM EPROM (EEPROM); a magnetic disc, a flexible disc, an optical disc, a compact disc, a mini disc, or a DVD.

A part of the functions of the Fourier transform unit 400, the peak detection unit 401, the azimuth detection unit 402, the object position determining unit 403, and the collision determining unit 404 may be implemented by dedicated hardware, and another part thereof may be implemented by software or firmware.

For example, the functions of the Fourier transform unit 400, the peak detection unit 401, and the azimuth detection unit 402 are implemented by a processing circuit 100 as dedicated hardware. The functions of the object position determining unit 403 and the collision determining unit 404 may be implemented by the processor 102 executing a program stored in the memory 103.

In this manner, the processing circuit can implement each function described above by hardware, software, firmware, or a combination thereof.

Next, the operation will be described.

Figure 3:
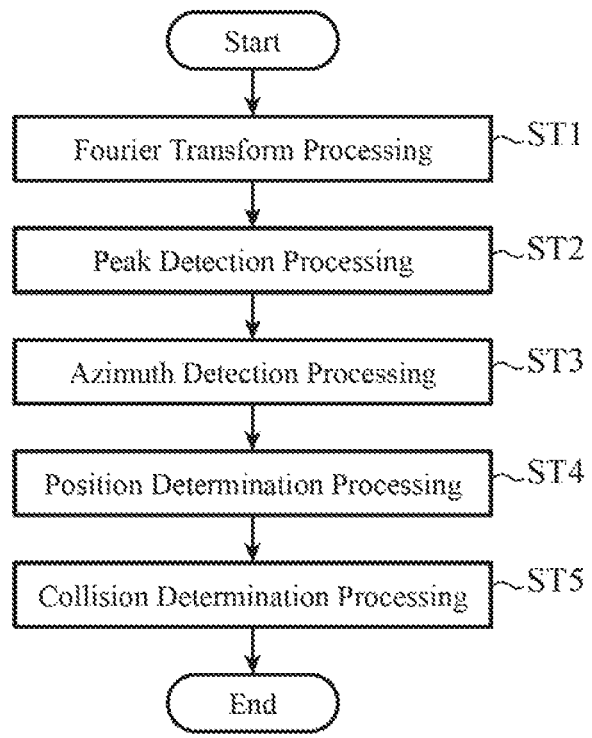
FIG. 3 is a flowchart illustrating a radar signal processing method according to the first embodiment.

FIG. 3 is a flowchart illustrating a radar signal processing method according to the first embodiment.

The Fourier transform unit 400 generates an FR map by performing Fourier transform on a reception signal converted into a digital signal by the ADC unit 3 (step ST1). Subsequently, the peak detection unit 401 detects a peak of the signal level on the basis of the FR map input from the Fourier transform unit 400 (step ST2). The azimuth detection unit 402 detects the azimuth of the object on the basis of the detection information of the peak of the signal level detected by the peak detection unit 401 (step ST3).

Figure 4:
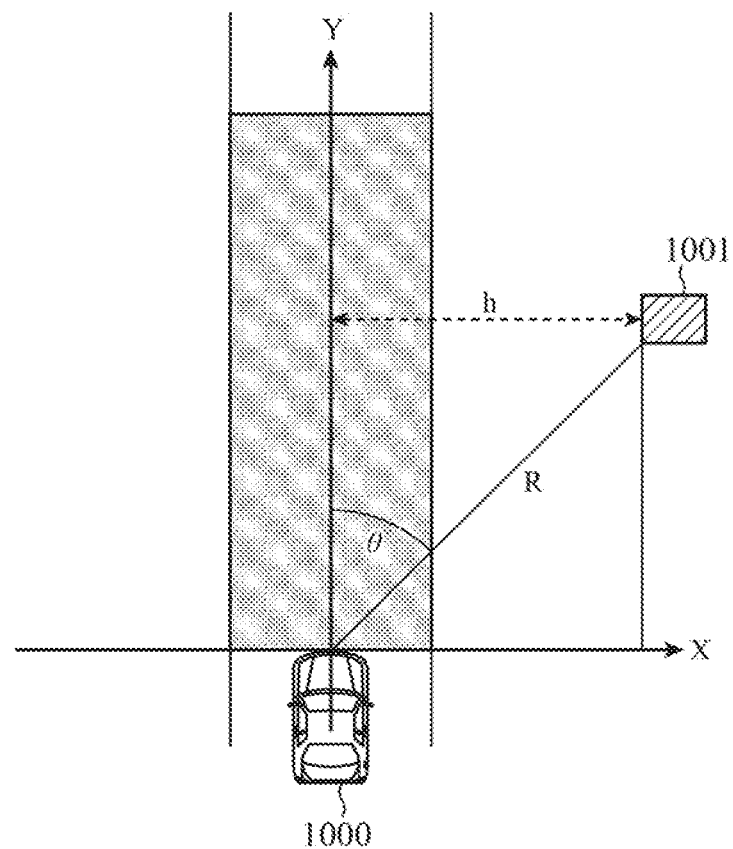
FIG. 4 is a diagram illustrating a positional relationship between an object and a vehicle on which the radar device according to the first embodiment is mounted.

The object position determining unit 403 determines whether the object is positioned in the traveling direction of the vehicle on the basis of the detection information of the azimuth of the object detected by the azimuth detection unit 402 (step ST4). FIG. 4 is a diagram illustrating a positional relationship between a vehicle 1000 on which the radar device 1 is mounted and an object 1001. In FIG. 4, the traveling direction of the vehicle 1000 is the Y-axis direction, and the direction perpendicular to the traveling direction of the vehicle 1000 is the X-axis direction.

An angle formed by the traveling direction of the vehicle 1000 and the direction from the vehicle 1000 toward the object 1001 is an azimuth angle θ. A range R is a relative distance between the traveling vehicle 1000 and the object 1001. The object position determining unit 403 determines, from among objects present around the vehicle 1000, the object 1001 present at a position having an X coordinate of h=R sin θ within a certain value as an object present at a position where there is a possibility of collision with the vehicle 1000.

Note that although the X coordinate of h=R sin θ of the object 1001 is used as a reference in position determination, for example, the vehicle width or the roadway width may be used as a reference.

The collision determining unit 404 determines whether the vehicle 1000 collides with the object 1001 on the basis of a variation in a Doppler velocity component of the vehicle 1000 with respect to the object 1001 present at a position away in a direction perpendicular to the traveling direction of the vehicle 1000 (step ST5).

Figure 5A:
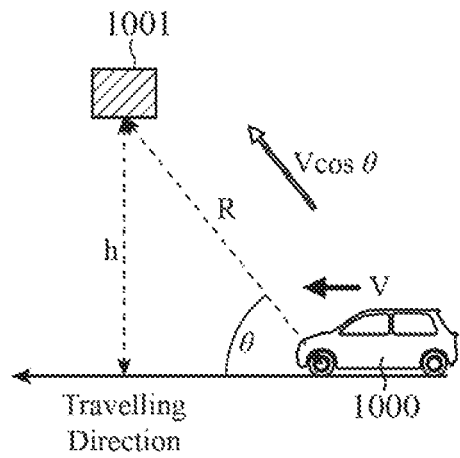
FIG. 5A is a diagram illustrating a positional relationship between the vehicle on which the radar device according to the first embodiment is mounted and an object that is present above the vehicle in the traveling direction.
Figure 5B:
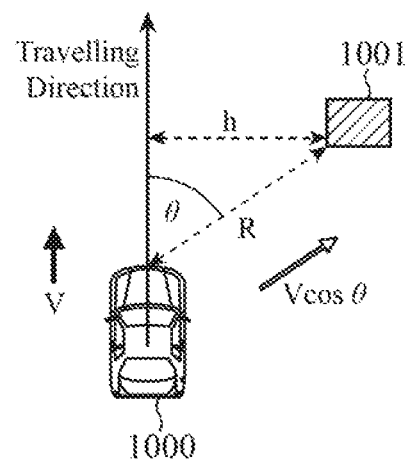
FIG. 5B is a diagram illustrating a positional relationship between the vehicle on which the radar device according to the first embodiment is mounted and an object that is present on a side of the vehicle in the traveling direction.

FIG. 5A is a diagram illustrating a positional relationship between the vehicle 1000 on which the radar device 1 is mounted and the object 1001 present above the vehicle 1000 in the traveling direction. FIG. 5B is a diagram illustrating a positional relationship between the vehicle 1000 on which the radar device 1 is mounted and the object 1001 present on a side of the vehicle 1000 in the traveling direction. In FIGS. 5A and 5B, it is assumed that the vehicle 1000 is traveling at a vehicle velocity V and that the object 1001 is stationary.

The objects 1001 illustrated in FIGS. 5A and 5B both have the same distance h away in a direction perpendicular to the traveling direction of the vehicle 1000, and thus Doppler velocity components V cos θ of the vehicle 1000 with respect to the objects 1001 are equal. The object 1001 illustrated in FIG. 5B has an X coordinate of h=R sin θ exceeding the certain value and deviates from the traveling direction of the vehicle 1000, and thus is determined to be at a position where there is no possibility of collision with the vehicle 1000 by the object position determining unit 403. On the other hand, the object 1001 illustrated in FIG. 5A has an X coordinate of h=R sin θ within the certain value, and thus the object position determining unit 403 determines that there is a possibility of collision with the vehicle 1000. Therefore, the collision determining unit 404 determines whether the vehicle 1000 collides with the object 1001 illustrated in FIG. 5A when the vehicle 1000 travels.

Figure 6:
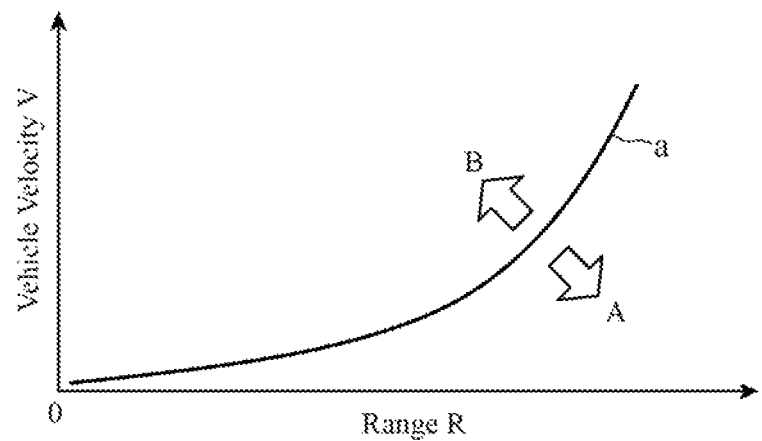
FIG. 6 is a graph illustrating a correspondence relationship between the velocity of the vehicle on which the radar device according to the first embodiment is mounted and the relative distance between the vehicle and the object.

FIG. 6 is a graph illustrating a correspondence relationship between the vehicle velocity V of the vehicle 1000 and the range R between the vehicle 1000 and the object 1001. The curve data a illustrated in FIG. 6 indicates a correspondence relationship between the velocity V of the vehicle 1000 and the range R between the vehicle 1000 and the object 1001 when the amount of variation in a Doppler velocity component of the vehicle 1000 with respect to the object 1001 reaches the first reference value. From the curve data a, the range R corresponding to the velocity V of the vehicle 1000 when the Doppler velocity component varies by the first reference value can be obtained.

For example, in a case where the resolution of the Doppler velocity of the vehicle 1000 with respect to the object 1001 is set as the first reference value, curve data a indicating a relationship in which the velocity V of the vehicle 1000 increases as the range R increases is obtained. When the Doppler velocity component varies by the first reference value, the object 1001 is present at a position away in a direction perpendicular to the traveling direction of the vehicle 1000. The correspondence relationship between the range R and the vehicle velocity V indicated by the curve data a varies depending on the resolution of the Doppler velocity of the vehicle 1000 with respect to the object 1001 and the vertical distance h (height) of the object 1001.

In a case where the values of the velocity V of the vehicle 1000 and the range R are in the region A having the curve data a illustrated in FIG. 6 as a boundary, the amount of variation in the Doppler velocity component reaches the first reference value (resolution value) at a large range R. The values of the velocity V of the vehicle 1000 and the range R in the region A have a small resolution value of the Doppler velocity, that is, a high resolution, and are values when the vertical distance h of the object 1001 is large.

As described above, in a case where the first reference value is the resolution value of the Doppler velocity of the vehicle 1000 with respect to the object 1001, the higher the resolution of the Doppler velocity is, or the greater the vertical distance h of the object 1001 is (the higher with respect to the horizontal plane), the amount of variation in the Doppler velocity component reaches the first reference value at a large range R.

Note that the larger the range R is, the object 1001 is positioned farther in the back of the vehicle 1000.

On the other hand, in a case where the values of the velocity V of the vehicle 1000 and the range R are in the region B having by the curve data a illustrated in FIG. 6 as a boundary, the amount of variation in the Doppler velocity component reaches the first reference value at a small range R. The values of the velocity V of the vehicle 1000 and the range R in the region B have a large resolution value of the Doppler velocity, that is, a low resolution, and are values when the vertical distance h of the object 1001 is small.

In a case where the first reference value is the resolution value of the Doppler velocity of the vehicle 1000 with respect to the object 1001, the lower the resolution of the Doppler velocity is, or the smaller the vertical distance h of the object 1001 is (the lower with respect to the horizontal plane), the amount of variation in the Doppler velocity component reaches the first reference value at a small range R.

Note that the smaller the range R is, the more the vehicle 1000 needs to approach the object 1001 in order for the Doppler velocity component to vary by the first reference value.

Figure 7:
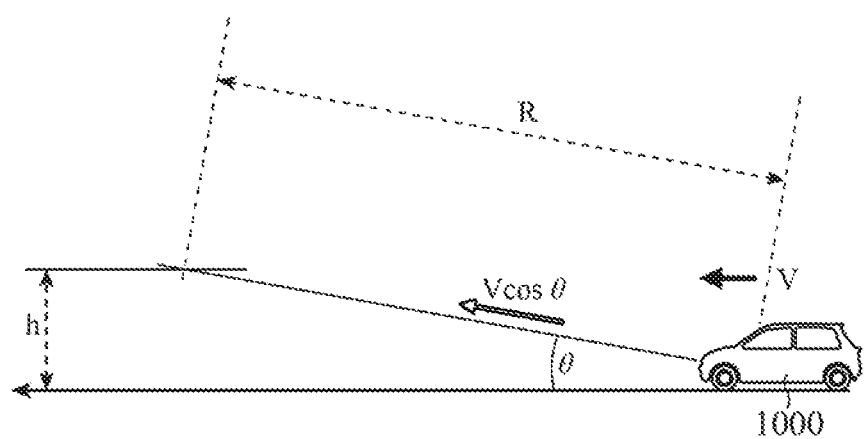
FIG. 7 is a diagram illustrating a relationship between the position of the vehicle on which the radar device according to the first embodiment is mounted and a position above the vehicle in the traveling direction at a lower limit distance from the horizontal plane on which the vehicle can pass.

FIG. 7 is a diagram illustrating a relationship between the position of the vehicle 1000 on which the radar device 1 is mounted and a position above the vehicle 1000 in the traveling direction at a lower limit distance h from the horizontal plane on which the vehicle 1000 can pass. The velocity V of the vehicle 1000 and the range R when the Doppler velocity component V cos θ of the vehicle 1000 illustrated in FIG. 7 varies by a certain value (first reference value) are obtained as the curve data a illustrated in FIG. 6. The collision determining unit 404 can determine whether the object above the traveling vehicle 1000 in the traveling direction is positioned at a distance h from the horizontal plane on which the vehicle 1000 can pass on the basis of the curve data a illustrated in FIG. 6.

Note that the curve data a indicating the correspondence relationship between the vehicle velocity V and the range R may be calculated in advance by experiments or the like and stored in the storing unit 41.

Next, details of the collision determination processing will be described.

Figure 8:
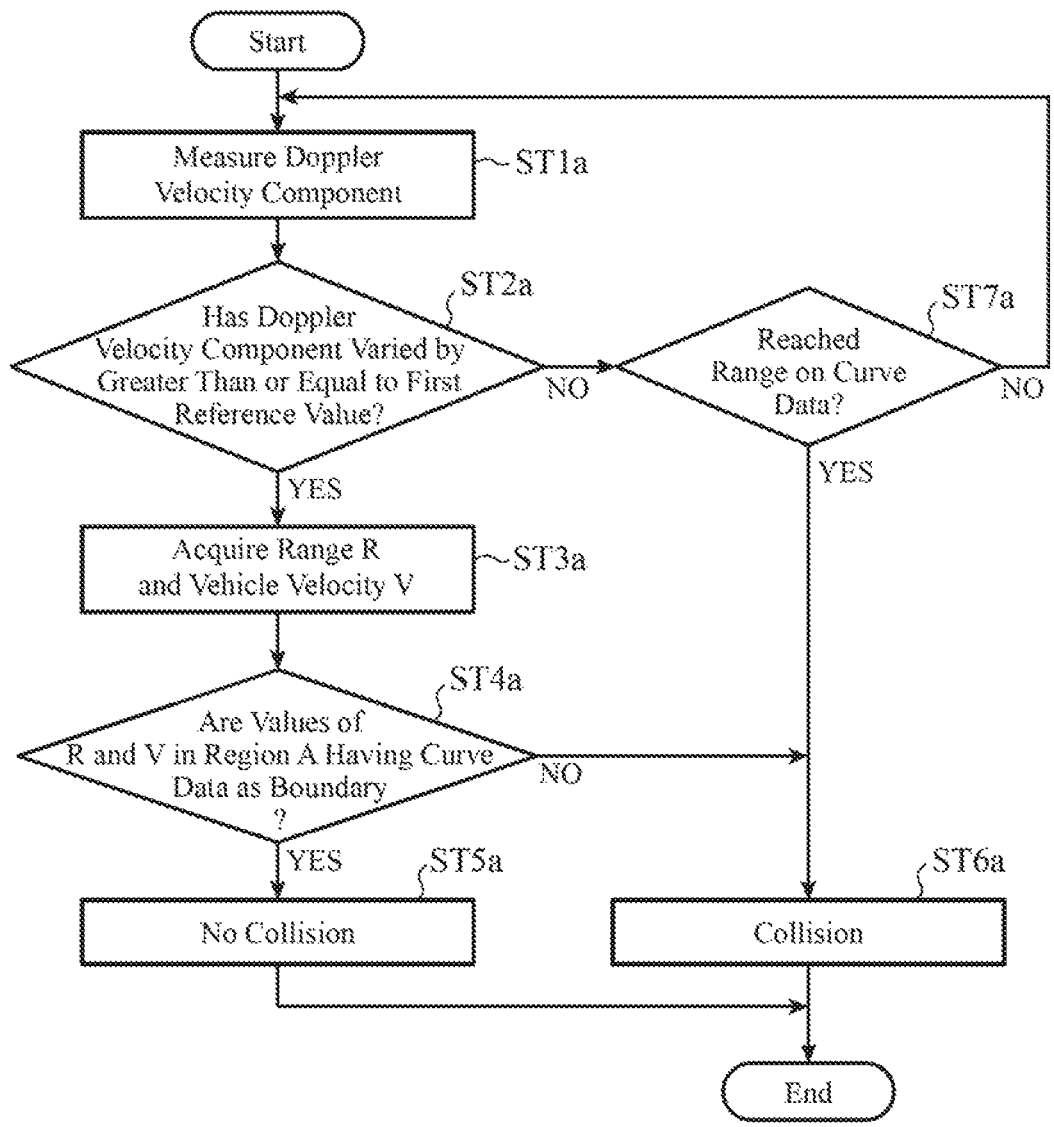
FIG. 8 is a flowchart illustrating collision determination processing in the first embodiment.

FIG. 8 is a flowchart illustrating the collision determination processing in the first embodiment and illustrating details of the processing in step ST5 of FIG. 3. Meanwhile, FIG. 9 is a diagram illustrating a positional relationship between the vehicle 1000 and the object 1001 present at a position above the vehicle 1000 in the traveling direction at a position higher than the lower limit distance h from the horizontal plane on which the vehicle 1000 can pass.

Figure 9:
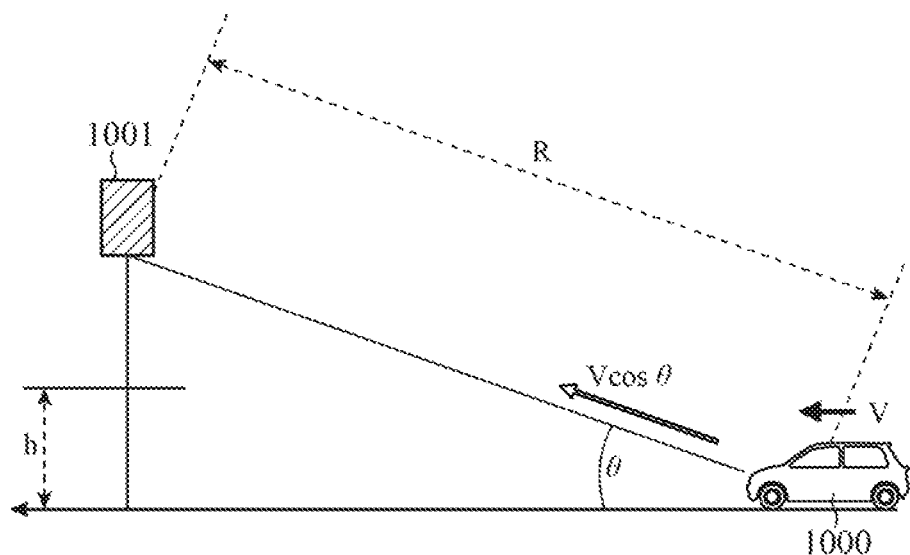
FIG. 9 is a diagram illustrating a positional relationship between the vehicle on which the radar device according to the first embodiment is mounted and the object present at a position above the vehicle in the traveling direction at a position higher than the lower limit distance from the horizontal plane on which the vehicle can pass.

The collision determining unit 404 measures the Doppler velocity component V cos θ of the vehicle 1000 with respect to the object 1001 illustrated in FIG. 9 at measurement time (step ST1a).

The collision determining unit 404 determines whether the Doppler velocity component V cos θ measured in step ST1a has varied by greater than or equal to the first reference value (step ST2a).

The first reference value may be, for example, an integer multiple (an integer greater than or equal to 1) of the Doppler velocity resolution of the vehicle 1000 relative to the object 1001.

Here, if it is determined that the amount of variation in the Doppler velocity component V cos θ is greater than or equal to the first reference value (step ST2a: YES), the collision determining unit 404 acquires the velocity V of the vehicle 1000 and range R at the time when the amount of variation in the Doppler velocity component V cos θ has reached the first reference value (step ST3a). For example, the collision determining unit 404 acquires the vehicle velocity V from a vehicle control unit (not illustrated) mounted on the vehicle 1000 and acquires the range R from the object position determining unit 403. Even when the vehicle velocity V varies over time, the collision determining unit 404 acquires the vehicle velocity V at the time when the amount of variation in the Doppler velocity component V cos θ has reached the first reference value.

Next, the collision determining unit 404 confirms whether the vehicle velocity V and the range R acquired in step ST3a have values in the region A having the curve data a illustrated in FIG. 6 as a boundary (step ST4a). Note that, by setting a plurality of different first reference values for the amount of variation in the Doppler velocity component, a plurality of pieces of curve data serving as a reference for collision determination can be obtained.

Figure 10:
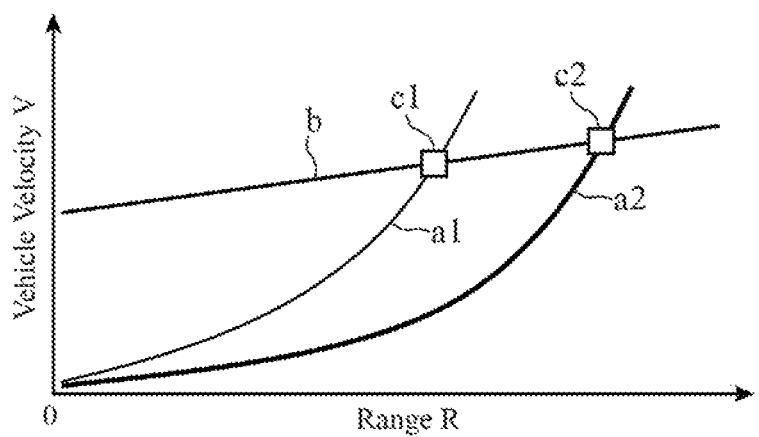
FIG. 10 is a graph illustrating a correspondence relationship between the velocity of the vehicle and the relative distance between the vehicle and the object in a case where the reference value of the amount of variation in the Doppler velocity component of the vehicle, on which the radar device according to the first embodiment is mounted, with respect to the object has different values.

FIG. 10 is a graph illustrating a correspondence relationship between the velocity V of the vehicle 1000 and the range R in a case where the first reference value for the amount of variation in the Doppler velocity component of the vehicle 1000 with respect to the object 1001 has different values. In FIG. 10, each of the curve data a1 and the curve data a2 illustrates a correspondence relationship between the vehicle velocity V and the range R in a case where different Doppler velocity resolution values are set as the first reference value. The storing unit 41 stores the curve data a corresponding to the first reference value at measurement time.

In step ST4a, the collision determining unit 404 reads the curve data a corresponding to the first reference value at measurement time from the storing unit 41, and confirms whether the vehicle velocity V and the range R acquired in step ST3a have values in the region A having the read curve data a as the boundary. Here, if the vehicle velocity V and the range R have values in the region A having the curve data a as a boundary (step ST4a: YES), the collision determining unit 404 determines that the vehicle 1000 does not collide with the object 1001 (step ST5a).

Figure 11:
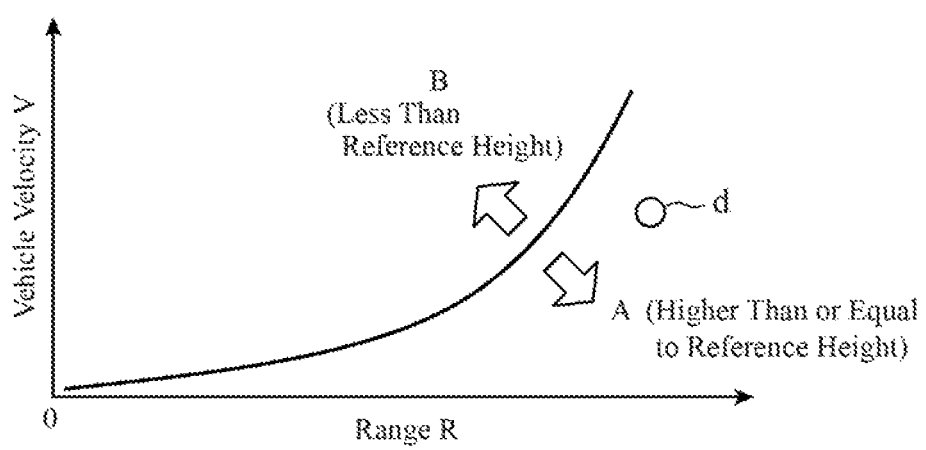
FIG. 11 is a graph illustrating a correspondence relationship between the velocity of the vehicle on which the radar device according to the first embodiment is mounted and the relative distance between the vehicle and the object.

FIG. 11 is a graph illustrating the correspondence relationship between the velocity V of the vehicle 1000 and the range R, in which a vehicle velocity V and a range R belonging to the region A are plotted. As illustrated in FIG. 11, in a case where the plot d of the vehicle velocity V and the range R represents values in the region A having the curve data a as a boundary, the vertical distance h at a position where the object 1001 is present is greater (higher) than a distance h when the vehicle velocity V and the range R reach the first reference value. As a result, the collision determining unit 404 can determine that the vehicle 1000 does not collide with the object 1001. Therefore, the vehicle 1000 can pass right under the object 1001.

On the other hand, if the vehicle velocity V and the range R have values in the region B having the curve data a as a boundary (step ST4a: NO), the collision determining unit 404 determines that the vehicle 1000 collides with the object 1001 (step ST6a). In a case where the vehicle velocity V and the range R have values in the region B having the curve data a as a boundary, the vertical distance h at a position where the object 1001 is present is smaller (lower) than the distance h when the vehicle velocity V and the range R reach the reference value. As a result, the collision determining unit 404 can determine that the vehicle 1000 collides with the object 1001. Therefore, the vehicle 1000 cannot pass right under the object 1001.

If it is determined that the amount of variation in the Doppler velocity component V cos θ is less than the reference value (step ST2a: NO), the collision determining unit 404 confirms whether the range R on the curve data a is reached at the current velocity V of the vehicle 1000 (step ST7a).

A straight line b illustrated in FIG. 10 represents the time variation of the vehicle velocity V. The intersection c1 between the straight line b and the curve data a1 represents the values of the vehicle velocity V and the range R at the time when the amount of variation of the Doppler velocity component V cos θ has reached the reference value corresponding to the curve data a1. Similarly, the intersection c2 between the straight line b and the curve data a2 represents the values of the vehicle velocity V and the range R at the time when the amount of variation of the Doppler velocity component V cos θ has reached the reference value corresponding to the curve data a2.

If the range R on the curve data a is reached at the velocity V of the vehicle 1000 at the time when the step ST7a is performed, that is, if the straight line b and the curve data a intersect (step ST7a: YES), it is considered that the Doppler velocity component V cos θ almost has not varied from the measurement time when the step ST1a has been performed. In this case, the collision determining unit 404 determines that the vertical distance h at the position where the object 1001 is present is smaller (lower) than the distance h when the vehicle velocity V and the range R reach the reference values, and determines that the vehicle 1000 collides with the object 1001 (step ST6a).

If the range R on the curve data a is not reached at the velocity V of the vehicle 1000 at the time when the step ST7a is performed, that is, if the straight line b and the curve data a does not intersect (step ST7a: NO), the collision determining unit 404 returns to the processing of step ST1a at next measurement time.

The range R on the curve data a corresponds to the distance corresponding to the first reference value. That the range R on the curve data a is reached at the velocity V of the vehicle 1000 means that the vehicle 1000 traveling at the velocity V has reached the distance corresponding to the first reference value.

As described above, when a variation in the Doppler velocity component V cos θ is less than the first reference value in step ST2a, the collision determining unit 404 determines that the vehicle 1000 collides with the object 1001 when the vehicle 1000 reaches the range R on the curve data a. Meanwhile, in a case where the vehicle velocity V varies and the range R increases after the determination in step ST2a has been performed, the collision determining unit 404 returns to step ST1a and performs collision determination at that vehicle velocity V.

As described above, in the radar signal processing device 4 according to the first embodiment, the collision determining unit 404 determines whether the vehicle 1000 collides with the object 1001 when the Doppler velocity component between the vehicle 1000 and the object 1001 varies to the first reference value or when the vehicle 1000 travels to the range R corresponding to the first reference value. For example, the first reference value is a resolution value of the Doppler velocity of the vehicle 1000 relative to the object 1001. The range R corresponding to the first reference value becomes longer as the Doppler velocity resolution is higher or as the position of the object 1001 present above the vehicle 1000 in the traveling direction is higher.

In addition, the collision determining unit 404 determines that the vehicle 1000 does not collide with the object 1001 when the amount of variation of the Doppler velocity component reaches the first reference value and the vehicle 1000 has not traveled to the range R corresponding to the first reference value. On the other hand, the collision determining unit 404 determines that the vehicle 1000 collides with the object 1001 when the amount of variation of the Doppler velocity component has not reached the first reference value and the vehicle 1000 has traveled to the range R corresponding to the first reference value. As a result, the radar signal processing device 4 can accurately and promptly perform collision determination between the vehicle 1000 and the object 1001 present above.

Second Embodiment

Figure 12:
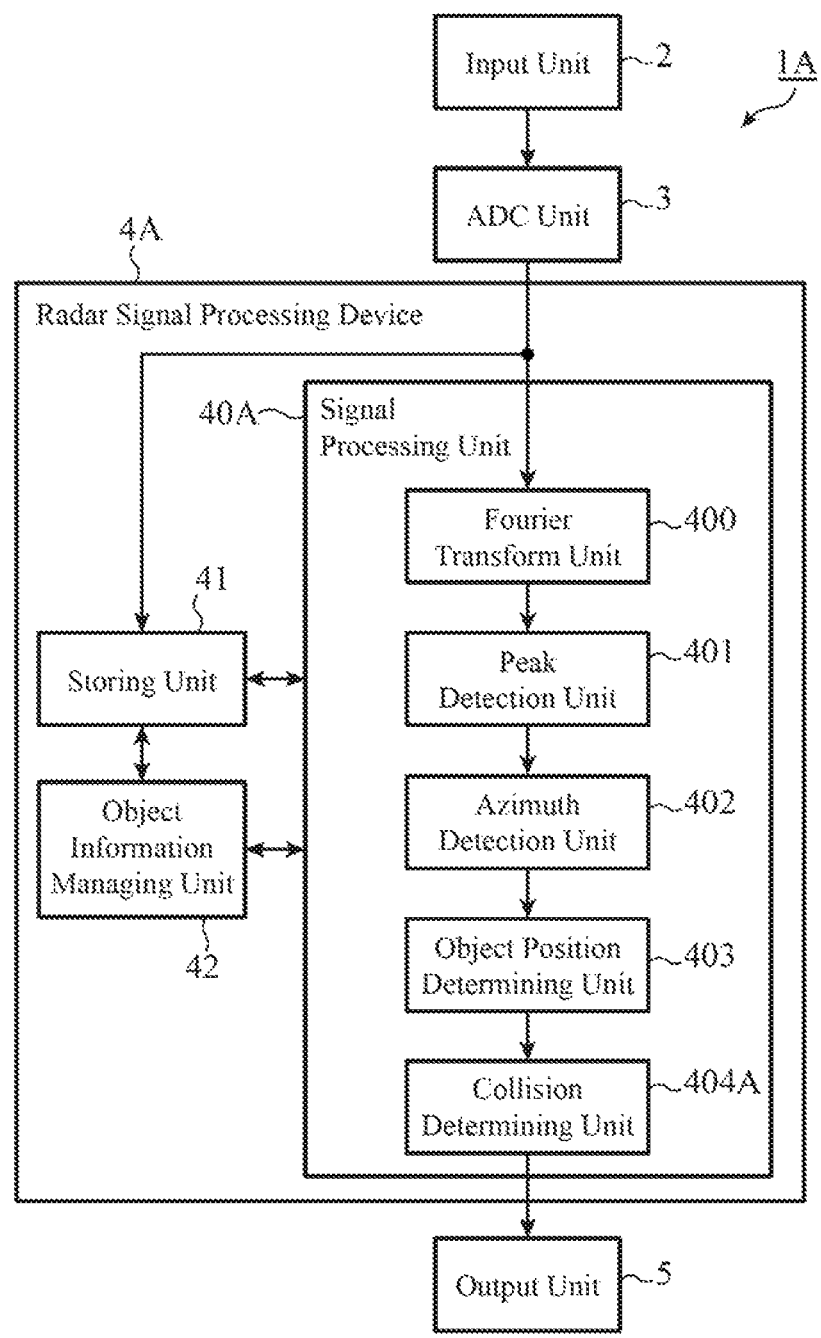
FIG. 12 is a block diagram illustrating a configuration of a radar device according to a second embodiment of the invention.

FIG. 12 is a block diagram illustrating a configuration of a radar device 1A according to a second embodiment of the invention. In FIG. 12, the same component as that in FIG. 1 is denoted with the same symbol and description thereof is omitted.

The radar device 1A is an in-vehicle radar, and detects the positional relationship between a vehicle and an object present around the vehicle. As illustrated in FIG. 12, the radar device 1A includes an input unit 2, an ADC unit 3, a radar signal processing device 4A, and an output unit 5.

The radar signal processing device 4A determines whether the vehicle collides with an object around the vehicle on the basis of the result of signal processing of a digital signal input from the ADC unit 3. The radar signal processing device 4A includes a signal processing unit 40A, a storing unit 41, and an object information managing unit 42 as its components. The signal processing unit 40A includes a Fourier transform unit 400, a peak detection unit 401, an azimuth detection unit 402, an object position determining unit 403, and a collision determining unit 404A. The collision determining unit 404A is a first collision determining unit.

The object information managing unit 42 assigns a management number for each piece of peak detection information of the signal level of a reception signal, and manages parameters related to the relationship between the state of the vehicle and the an object present around the vehicle and attribute data of the place where the vehicle is present for each management number. The peak detection information includes data for specifying the peak position of the signal level of the reception signal, and includes, for example, the range and the Doppler velocity between the vehicle and the object at the time when the peak of the signal level occurs. The above parameters managed for each management number include the range between the vehicle and the object, the relative velocity, the azimuth in which the object is present, and the like. The attribute data indicates that the vehicle is present on a road, for example.

Even when the peak detection unit 401 detects a plurality of peaks of the signal level of the reception signal as a result of a radio wave transmitted to the vicinity of the vehicle being reflected by a plurality of objects and received by the input unit 2, the object information managing unit 42 manages the various types of information described above assuming that an object is present for each peak point.

The various types of information (parameters and attribute data) are stored in the storing unit 41.

Figure 13:
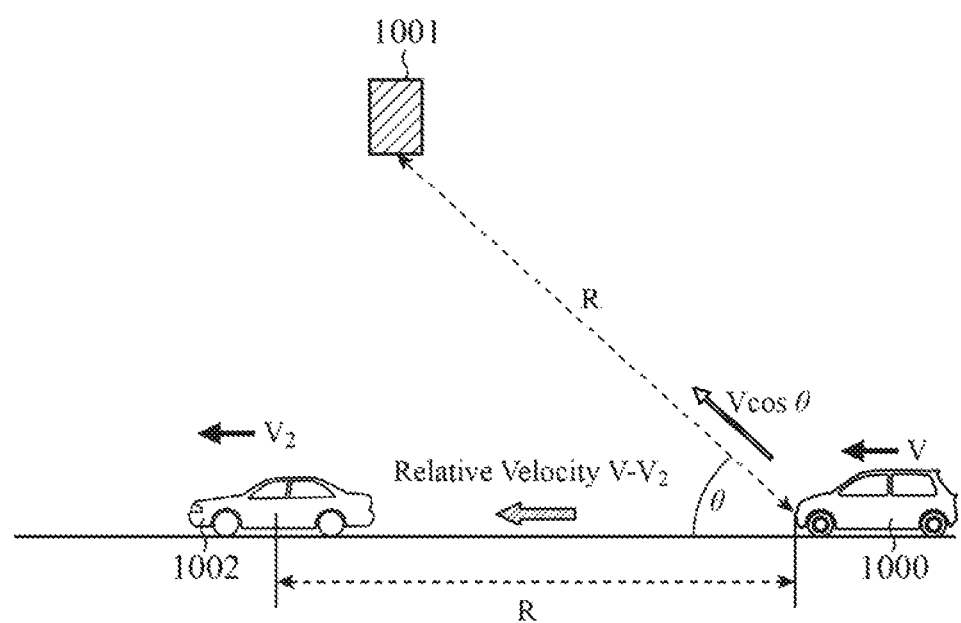
FIG. 13 is a diagram illustrating a positional relationship among a vehicle on which the radar device according to the second embodiment is mounted, an object that is present above the vehicle in the traveling direction, and a preceding vehicle of the vehicle.

FIG. 13 is a diagram illustrating a positional relationship among a vehicle 1000 on which the radar device 1A is mounted, an object 1001 present above the vehicle 1000 in the traveling direction, and a preceding vehicle 1002 of the vehicle 1000. The vehicle 1000 is traveling at a velocity V, and the preceding vehicle 1002 is traveling at a velocity $V_2$. The collision determining unit 404A determines whether the vehicle 1000 collides with the object 1001 when there is a difference between the relative velocity $V-V_2$ between the object (preceding vehicle 1002) present other than the object 1001 around the vehicle 1000, and the vehicle 1000 and the Doppler velocity component V cos θ.

The functions of the Fourier transform unit 400, the peak detection unit 401, the azimuth detection unit 402, the object position determining unit 403, and the collision determining unit 404A in the radar signal processing device 4A are implemented by a processing circuit. In other words, the radar signal processing device 4A includes a processing circuit for executing processing from step ST1b to step ST8b as will be described later with reference to FIG. 14. The processing circuit may be dedicated hardware, or may be a processor that executes a program stored in a memory.

Next, the operation will be described.

Figure 14:
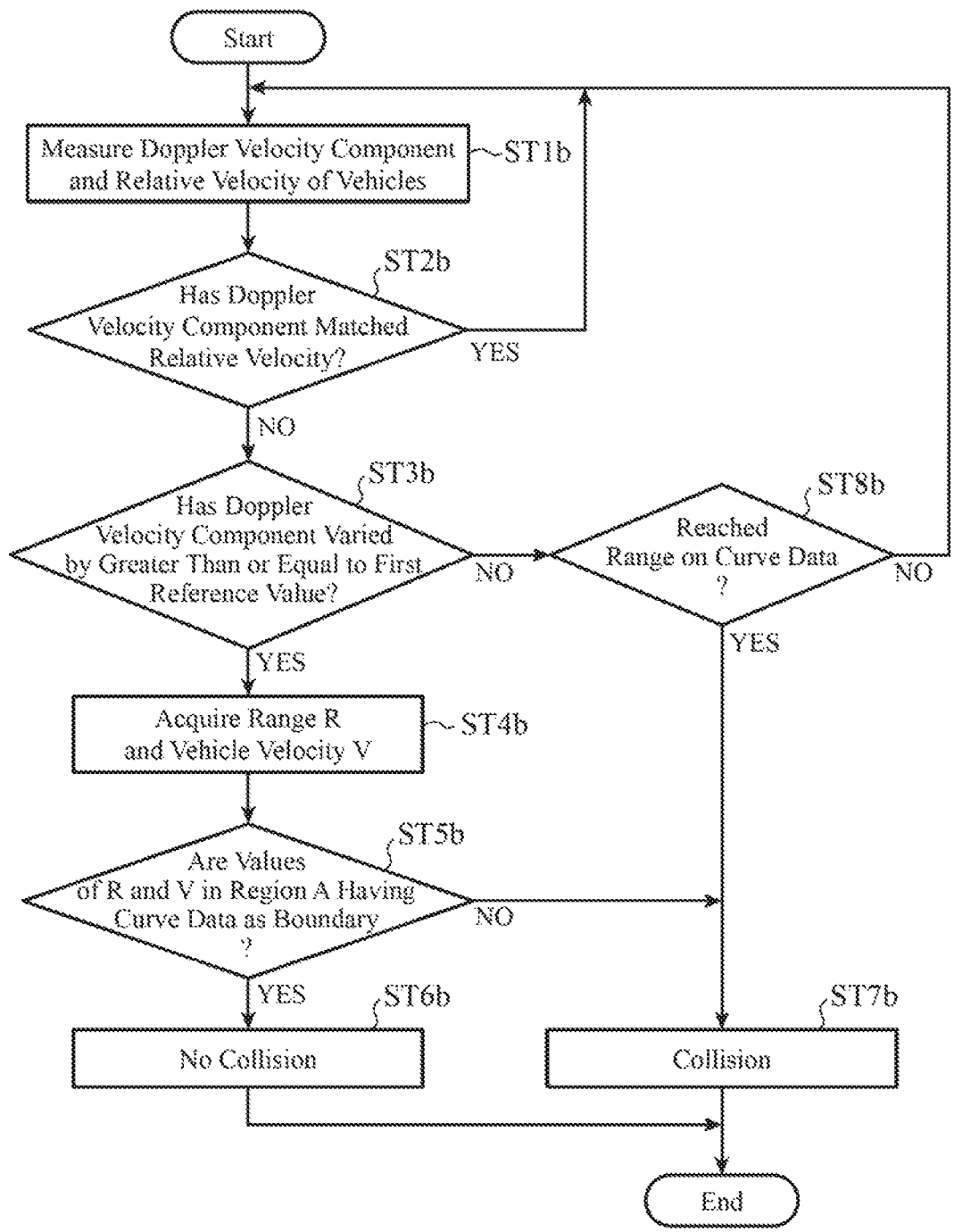
FIG. 14 is a flowchart illustrating collision determination processing in the second embodiment.

FIG. 14 is a flowchart illustrating collision determination processing in the second embodiment and illustrates details of the processing in step ST5 of FIG. 3. Processing from step ST3b to step ST8b in FIG. 14 is similar to the processing from step ST2a to step ST7a in FIG. 8, and thus description thereof is omitted.

In step ST1b, the collision determining unit 404A measures the Doppler velocity component V cos θ of the vehicle 1000 with respect to the object 1001 and the relative velocity $V-V_2$ between the vehicle 1000 and the preceding vehicle 1002 at measurement time. These pieces of measurement information are managed by the object information managing unit 42.

The collision determining unit 404 determines whether there is an object the relative velocity with which matches the Doppler velocity component among a plurality of objects related to each of multiple peak points detected at the measurement time of step ST1b on the basis of the information managed by the object information managing unit 42 (step ST2b). If it is determined that the Doppler velocity component matches the relative velocity (step ST2b: YES), the collision determining unit 404A returns to step ST1b at next measurement time.

On the other hand, if it is determined that the Doppler velocity component and the relative velocity do not match, that is, there is a difference between the two (step ST2b: NO), the collision determining unit 404A proceeds to the processing of step ST3b and executes processing from step ST2a to ST7a of FIG. 8.

Figure 15:
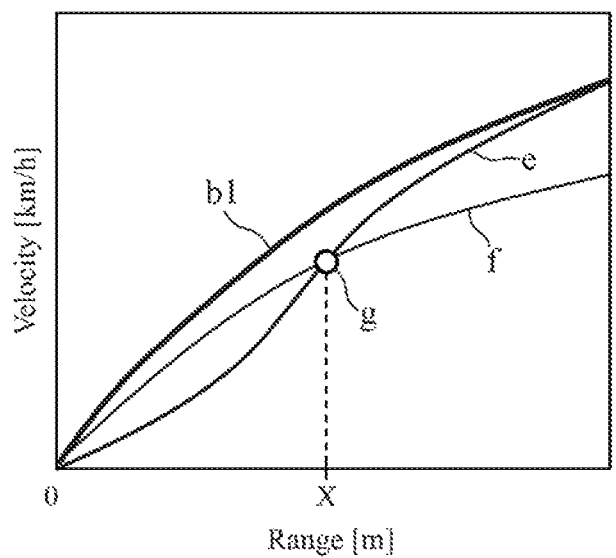
FIG. 15 is a graph illustrating a correspondence relationship among the velocity of a vehicle on which the radar device according to the second embodiment is mounted, the Doppler velocity with respect to an object, and the relative velocity between the vehicle and a preceding vehicle.

FIG. 15 is a graph illustrating a correspondence relationship among the velocity V of the vehicle 1000, the Doppler velocity with respect to the object 1001, and the relative velocity $V-V_2$ between the vehicle 1000 and the preceding vehicle 1002. In FIG. 15, data b1 represents the time variation of the velocity V of the vehicle 1000, and represents velocity variations when the vehicle 1000 is gradually decelerating. Meanwhile, data e indicates the time variation of the Doppler velocity component V cos θ of the vehicle 1000 with respect to the object 1001. Data f indicates the time variation of the relative velocity $V-V_2$ between the vehicle 1000 and the preceding vehicle 1002.

At the intersection g between the data e and the data f, the Doppler velocity component V cos θ of the vehicle 1000 with respect to the object 1001 and the relative velocity $V-V_2$ between the vehicle 1000 and the preceding vehicle 1002 match. At this time, since the object 1001 and the preceding vehicle 1002 exist in a Doppler velocity bin, the collision determining unit 404A cannot separate the two.

That is, it is not possible to distinguish whether the range X is a range with respect to the object 1001 or a range with respect to the preceding vehicle 1002. For this reason, the collision determining unit 404A does not perform collision determination when the Doppler velocity component matches the relative velocity.

Note that although there are cases where the Doppler velocity component and the relative velocity temporarily match in an actual environment, in a case where the velocity V of the vehicle 1000 is greater than or equal to a certain value, there is a high possibility that the relationship in which the two match is lost over time. In this case, as illustrated in FIG. 14, it is only required that collision determination be performed at next measurement time.

As described above, in the radar signal processing device 4A according to the second embodiment, the collision determining unit 404A determines whether the vehicle 1000 collides with the object 1001 when there is a difference between the relative velocity $V-V_2$ between the object (preceding vehicle 1002) present other than the object 1001 around the vehicle 1000, and the vehicle 1000 and the Doppler velocity component V cos θ.

As a result, the radar signal processing device 4A can accurately and promptly perform collision determination between the vehicle 1000 and the object 1001 even when an object such as the preceding vehicle 1002 is present in the vicinity of the vehicle 1000 in addition to the object 1001.

Third Embodiment

Figure 16:
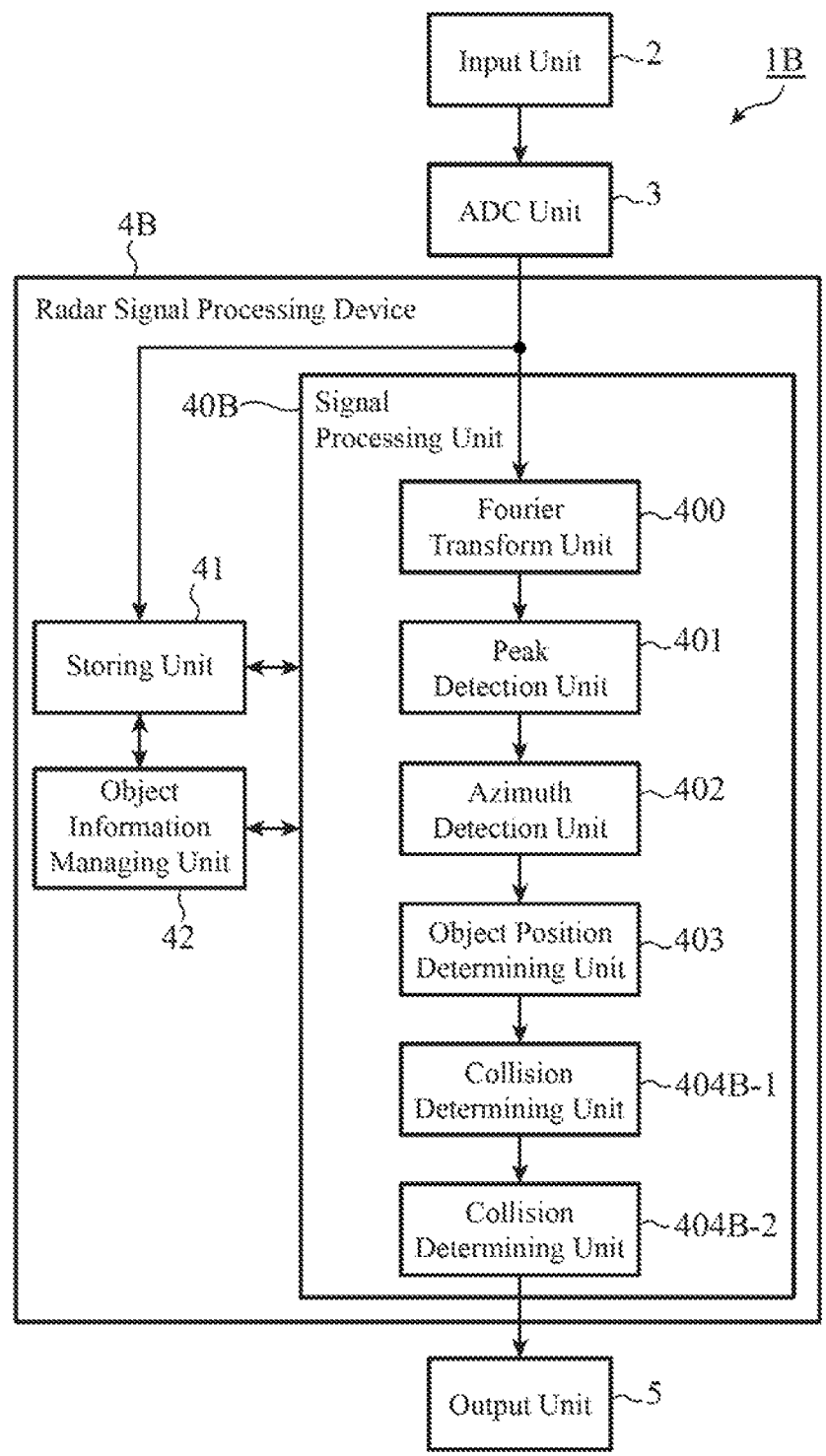
FIG. 16 is a block diagram illustrating a configuration of a radar device according to a third embodiment of the invention.

FIG. 16 is a block diagram illustrating a configuration of a radar device 1B according to a third embodiment of the invention. In FIG. 16, the same component as that in FIGS. 1 and 12 is denoted with the same symbol, and descriptions thereof are omitted. The radar device 1B is an in-vehicle radar, and detects the positional relationship between a vehicle and an object present around the vehicle. As illustrated in FIG. 16, the radar device 1B includes an input unit 2, an ADC unit 3, a radar signal processing device 4B, and an output unit 5.

The radar signal processing device 4B determines whether the vehicle collides with an object around the vehicle on the basis of the result of signal processing of a digital signal input from the ADC unit 3. The radar signal processing device 4B includes a signal processing unit 40B, a storing unit 41, and an object information managing unit 42 as its components. The signal processing unit 40B includes a Fourier transform unit 400, a peak detection unit 401, an azimuth detection unit 402, an object position determining unit 403, a collision determining unit 404B-1, and a collision determining unit 404B-2. The collision determining unit 404B-1 is a first collision determining unit, and the collision determining unit 404B-2 is a second collision determining unit.

Figure 17:
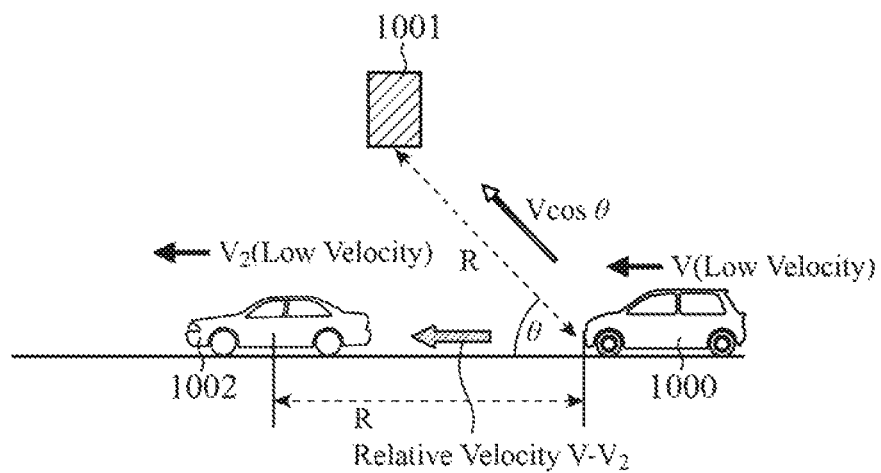
FIG. 17 is a diagram illustrating a positional relationship among a vehicle on which the radar device according to the third embodiment is mounted, an object that is present above the vehicle in the traveling direction, and a preceding vehicle of the vehicle.

FIG. 17 is a diagram illustrating a positional relationship among a vehicle 1000 on which the radar device 1B is mounted, an object 1001 present above the vehicle 1000 in the traveling direction, and a preceding vehicle 1002 of the vehicle 1000. Like in the second embodiment, the collision determining unit 404B-1 determines whether the vehicle 1000 collides with the object 1001 when there is a difference between the relative velocity $V-V_2$ between an object (preceding vehicle 1002) present other than the object 1001 around the vehicle 1000 and the vehicle 1000 and the Doppler velocity component V cos θ.

Figure 18:
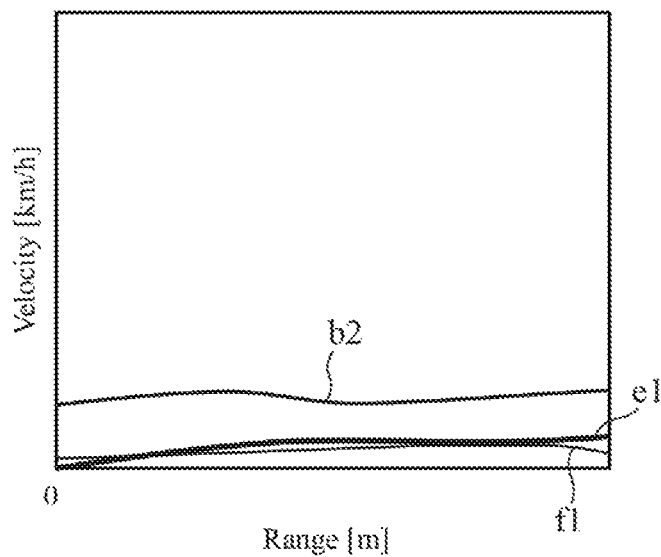
FIG. 18 is a graph illustrating a correspondence relationship among the velocity of the vehicle on which the radar device according to the third embodiment is mounted, the Doppler velocity component of the vehicle with respect to an object present above the vehicle in the traveling direction, and the relative velocity between the vehicle and the preceding vehicle.

FIG. 18 is a graph illustrating a correspondence relationship among the velocity V of the vehicle 1000 on which the radar device 1B is mounted, the Doppler velocity component of the vehicle 1000 with respect to the object 1001 present above the vehicle 1000 in the traveling direction, and the relative velocity $V-V_2$ between the vehicle 1000 and the preceding vehicle 1002. In FIG. 18, data b2 indicates the time variation of the velocity V of the vehicle 1000, and data e1 indicates the time variation of the Doppler velocity component V cos θ of the vehicle 1000 with respect to the object 1001. Data f1 indicates the time variation of the relative velocity $V-V_2$ between the vehicle 1000 and the preceding vehicle 1002.

In FIG. 18, as is clear from the data b2, the vehicle 1000 is traveling at a velocity that is low enough to stop immediately (hereinafter referred to as the low velocity). When the vehicle 1000 is travelling at a low velocity, as is apparent from the data e1 and the data f1, there is almost no difference between the Doppler velocity component $V \cos \theta$ and the relative velocity $V-V_2$. In this case, it is not possible to perform the collision determination on the basis of a change in the Doppler velocity component as illustrated in the first and second embodiments.

The collision determining unit 404B-2 determines whether the collision determination can be performed on the basis of a change in the range with respect to an object detected around the vehicle 1000.

Specifically, the collision determining unit 404B-2 determines that the vehicle 1000 collides with the object 1001 when the amount of variation of the range R between the vehicle 1000 and the preceding vehicle 1002 over time is a monotonous decrease, and the amount of decrease in the range R is greater than or equal to a second reference value.

Furthermore, the collision determining unit 404B-2 determines that the vehicle 1000 does not collide with the object 1001 when the amount of variation of the range R is not a monotonous decrease or when the amount of decrease of the range R is less than the second reference value.

The functions of the Fourier transform unit 400, the peak detection unit 401, the azimuth detection unit 402, the object position determining unit 403, and the collision determining unit 404B-1, and the collision determining unit 404B-2 in the radar signal processing device 4B are implemented by a processing circuit.

In other words, the radar signal processing device 4B includes a processing circuit for executing processing from step ST1c to step ST5c as will be described later with reference to FIG. 19.

The processing circuit may be dedicated hardware, or may be a processor that executes a program stored in a memory.

Next, the operation will be described.

Figure 19:
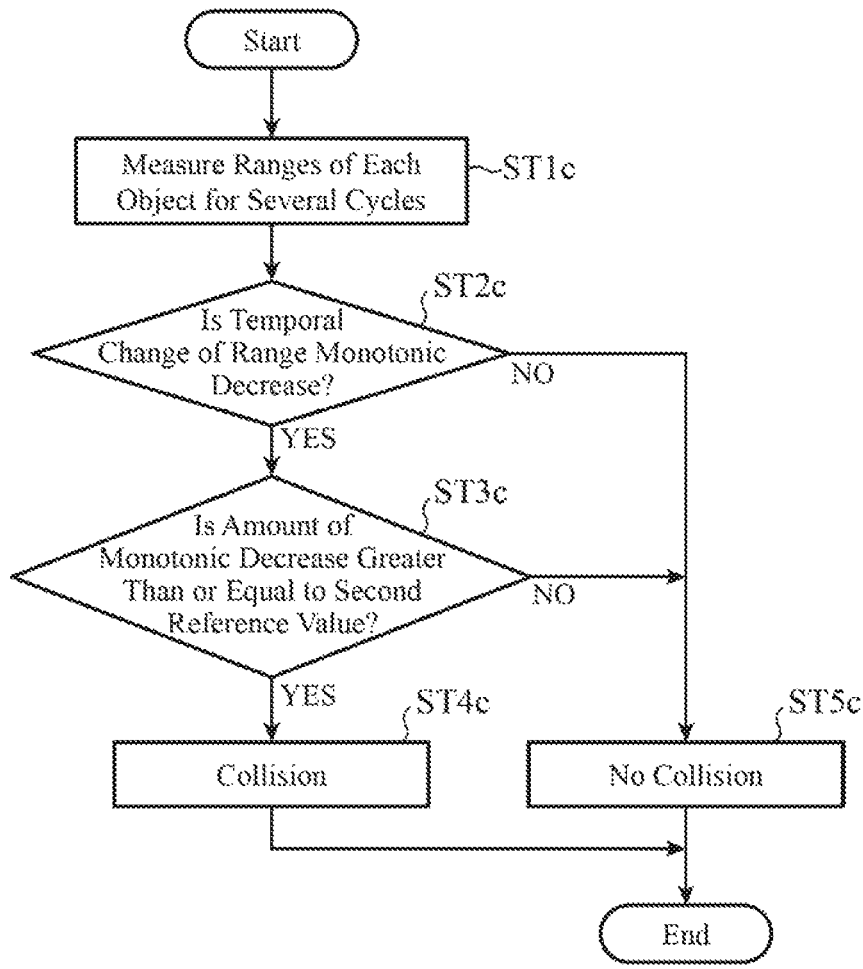
FIG. 19 is a flowchart illustrating collision determination processing in the third embodiment.

FIG. 19 is a flowchart illustrating collision determination processing in the third embodiment and illustrates details of the processing in step ST5 of FIG. 3. The collision determination processing illustrated in FIG. 19 is performed when it is determined in collision determination by the collision determining unit 404B-1 that the vehicle 1000 does not collide with the object 1001.

The collision determining unit 404B-2 measures the range between the object detected around the vehicle 1000 and the vehicle 1000 for several cycles (step ST1c). For example, a time interval for a radio wave from transmission to the vicinity of the vehicle 1000 to reception of the radio wave reflected by an object present around the vehicle 1000 is defined as one cycle. The collision determining unit 404B-2 measures ranges for a plurality of cycles for each of multiple objects detected around the vehicle 1000.

Figure 20:
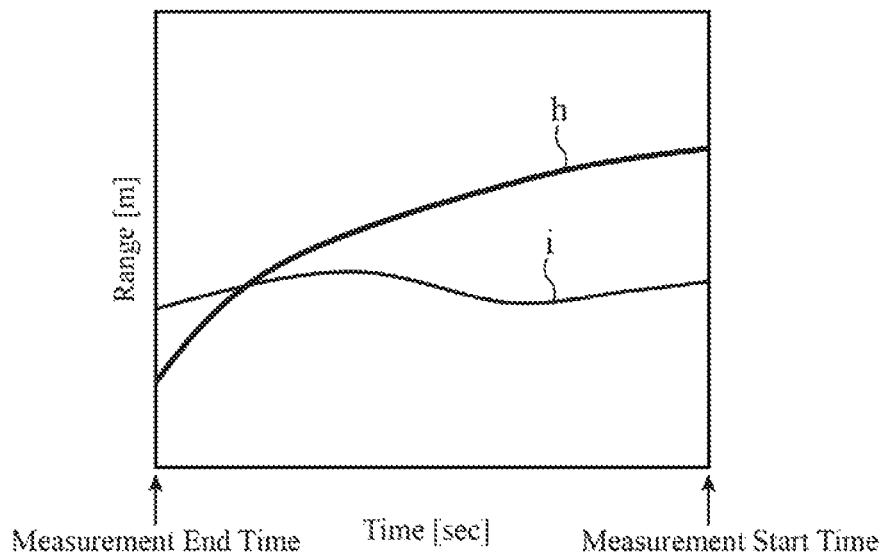
FIG. 20 is a graph illustrating a correspondence relationship between the relative distance between the vehicle and the object present above the vehicle in the traveling direction and the relative distance between the vehicle and the preceding vehicle when it is assumed that the velocity of the vehicle on which the radar device according to the third embodiment is mounted is constant.

FIG. 20 is a graph illustrating a correspondence relationship among the range between the vehicle 1000 and the object 1001, the range between the vehicle 1000 and the preceding vehicle 1002, and time in a case where it is assumed that the velocity V of the vehicle 1000 on which the radar device 1B is mounted is constant. In FIG. 20, data h indicates the time variation of the range between the vehicle 1000 and the object 1001, and data i indicates the time variation of the range between the vehicle 1000 and the preceding vehicle 1002.

In the case where the vehicle 1000 is traveling at a constant low velocity, as apparent from the data h, the range between the vehicle 1000 and the object 1001 monotonously decreases with time.

On the other hand, as apparent from the data i, the range between the vehicle 1000 and the preceding vehicle 1002 repeatedly increases and decreases irregularly.

The collision determining unit 404B-2 distinguishes the object 1001 and the preceding vehicle 1002 from the amount of variation in the range by using such characteristics of the time variation of the range.

The collision determining unit 404B-2 confirms whether the time variation of the range measured in step ST1c is a monotonous decrease (step ST2c). If the time variation of the range is a monotonous decrease (step ST2c: YES), it can be determined that the range is with respect to the object 1001. In this case, the collision determining unit 404B-2 confirms whether the amount of the monotonous decrease is greater than or equal to the second reference value (step ST3c).

The second reference value may be determined using the amount of variation of the Doppler velocity component described in the first embodiment and the second embodiment. For example, assuming that the height (distance h) of the object 1001 from the horizontal plane is the lower limit distance that the vehicle 1000 illustrated in FIG. 7 can pass, data h illustrated in FIG. 20 is obtained. That is, the data h indicates the time variation of the range in the case where the amount of variation of the range is the second reference value. Therefore, a correspondence relationship between the range and time indicated by the data h is obtained in advance by experiments or the like and stored in the storing unit 41.

If the amount of the monotonous decrease is greater than or equal to the second reference value (step ST3c: YES), the collision determining unit 404B-2 determines that the vehicle 1000 collides with the object 1001 (step ST4c). If the amount of the monotonous decrease is greater than or equal to the second reference value, it means that the range actually measured at the measurement end time in FIG. 20 is a value in the lower region having the data h as a boundary. In this case, the object 1001 is present at a position smaller (lower) than the lower limit distance that the vehicle 1000 can pass. Therefore, the collision determining unit 404B-2 determines that the vehicle 1000 collides with the object 1001.

If the time variation of the range is not a monotonous decrease (step ST2c: NO), it can be determined that this range is with respect to the preceding vehicle 1002. In this case, the collision determining unit 404B-2 employs the determination result of the collision determining unit 404B-1, and determines that vehicle 1000 does not collide with object 1001 (step ST5c).

If the amount of the monotonous decrease is less than the second reference value (step ST3c: NO), the range actually measured at the measurement end time in FIG. 20 has a value in the upper region having the data h as a boundary. In this case, the object 1001 is present at a position that is larger (higher) than the lower limit distance that the vehicle 1000 can pass. Therefore, the collision determining unit 404B-2 determines that the vehicle 1000 does not collide with the object 1001.

As described above, the radar signal processing device 4B according to the third embodiment includes the collision determining unit 404B-2. The third embodiment is premised on the case where the vehicle 1000 is travelling at a low velocity and the difference between the relative velocity $V-V_2$ between the vehicle 1000 and the preceding vehicle 1002 and the Doppler velocity component is smaller than the threshold value. In this case, the collision determining unit 404B-2 determines that the vehicle 1000 collides with the object 1001 when the amount of variation in the range R between the vehicle 1000 and the preceding vehicle 1002 over time is a monotonous decrease, and the amount of decrease of the range R is greater than or equal to the second reference value. Furthermore, the collision determining unit 404B-2 determines that the vehicle 1000 does not collide with the object 1001 when the amount of variation in the range R is not monotonously decreased or when the amount of decrease of the range R is less than the second reference value. With this configuration, the radar signal processing device 4B can perform collision determination between the vehicle 1000 and the object 1001 accurately and promptly even when the vehicle 1000 is travelling at a low velocity and the difference between the relative velocity $V - V_2$ between the vehicle 1000 and the preceding vehicle 1002 and the Doppler velocity component is smaller than the threshold value.

Note that the present invention is not limited to the above embodiments, and the present invention may include a flexible combination of the individual embodiments, a modification of any component of the individual embodiments, or omission of any component in the individual embodiments within the scope of the present invention.

INDUSTRIAL APPLICABILITY

A radar signal processing device according to the present invention can accurately and promptly perform collision determination between a vehicle and an object present above, and thus can be used for, for example, an in-vehicle radar mounted on various types of vehicles.

REFERENCE SIGNS LIST 1, 1A, 1B: Radar device, 2: Input unit, 3: ADC unit, 4, 4A, 4B: Radar signal processing device, 5: Output unit, 40, 40A, 40B: Signal processing unit, 41: Storing unit, 42: Object information managing unit, 100: Processing circuit, 101: Storage device, 102: Processor, 103: Memory, 400: Fourier transform unit, 401: Peak detection unit, 402: Azimuth detection unit, 403: Object position determining unit, 404, 404A, 404B-1, 404B-2: Collision determining unit, 1000: Vehicle, 1001: Object, 1002: Preceding vehicle.

The invention claimed is:

1. A radar signal processing device comprising:
processing circuitry performing a process to:
generate a frequency range (FR) map in which a relative distance and a relative velocity between a vehicle and an object are associated with a signal level of a reception signal by performing Fourier transform on the reception signal of a radio wave transmitted to a vicinity of the vehicle and reflected by the object;
detect a peak of a signal intensity level on a basis of the FR map;
detect an azimuth of the object on a basis of detection information of the peak of the signal intensity level;
determine whether the object is present at a position in a travelling direction of the vehicle on a basis of detection information of the azimuth; and
determine that the vehicle collides with the object determined to be present at the position in the travelling direction of the vehicle, based on curve data indicating a correspondence relationship between a traveling velocity of the vehicle and a relative distance between the vehicle and the object present at a position away in a direction perpendicular to the travelling direction of the vehicle, in a two-dimensional domain of the relative distance versus the traveling velocity, when an amount of variation in a Doppler velocity component of the vehicle with respect to the object present at the position away in the direction perpendicular to the travelling direction of the vehicle has reached a first reference value, and when the vehicle has traveled to a distance corresponding to the first reference value,
wherein the first reference value is a resolution value of a Doppler velocity of the vehicle with respect to the object, and
the distance corresponding to the first reference value becomes longer as the resolution of the Doppler velocity is higher, or a position of the object present above the vehicle in the travelling direction becomes higher.

2. The radar signal processing device according to claim 1,
wherein the processor determines the vehicle collides with the object when the traveling velocity of the vehicle and the relative distance between the vehicle and the object belong to a region under the curve data in the two-dimensional domain of the relative distance versus the traveling velocity, and
the processor determines the vehicle does not collide with the object when the traveling velocity of the vehicle and the relative distance between the vehicle and the object belong to a region above the curve data in the two-dimensional domain of the relative distance versus the traveling velocity.

3. The radar signal processing device according to claim 1,
wherein the process determines that the vehicle does not collide with the object when the amount of variation in the Doppler velocity component has reached the first reference value and the vehicle has not travelled to the distance corresponding to the first reference value, and determines that the vehicle collides with the object when the amount of variation in the Doppler velocity component has not reached the first reference value and the vehicle has travelled to the distance corresponding to the first reference value.

4. The radar signal processing device according to claim 1,
wherein the process determines whether the vehicle collides with the object present at the position away in the direction perpendicular to the travelling direction of the vehicle when a relative velocity between the vehicle and a nearby object present around the vehicle other than the object is different from the Doppler velocity component.

5. The radar signal processing device according to claim 4, further comprising to:
in a case where the travelling velocity of the vehicle is lower than a reference velocity, and a difference between the relative velocity between the vehicle and the object and the Doppler velocity component is smaller than a threshold value, determine that the vehicle collides with the object when the amount of variation in the relative distance between the vehicle and the object over time is a monotonous decrease and the amount of the decrease in the relative distance is greater than or equal to a second reference value, and determine that the vehicle does not collide with the object when the amount of variation in the relative distance is not a monotonous decrease or the amount of the decrease in the relative distance is less than the second reference value.

6. A radar device comprising the radar signal processing device according to claim 1, wherein the radar device further comprises:
an inputter to receive a radio wave transmitted to a vicinity of the vehicle and reflected by the object;
an AD converter to convert a reception signal received by the inputter into a digital signal;
wherein whether the vehicle collides with the object is determined by inputting the reception signal converted into the digital signal by the AD converter; and
an outputter to output a determination result by the radar signal processing device.

7. A radar signal processing method comprising:
generating a frequency range (FR) map in which a relative distance and a relative velocity between a vehicle and an object are associated with a signal intensity level of a reception signal by performing Fourier transform on the reception signal of a radio wave transmitted to a vicinity of the vehicle and reflected by the object;
detecting a peak of a signal intensity level on a basis of the FR map;
detecting an azimuth of the object on a basis of detection information of the peak of the signal intensity level;
determining whether the object is present at a position in a travelling direction of the vehicle on a basis of detection information of the azimuth; and
determining that the vehicle collides with the object determined to be present at the position in the travelling direction of the vehicle, based on curve data indicating a correspondence relationship between a traveling velocity of the vehicle and a relative distance between the vehicle and the object present at a position away in a direction perpendicular to the travelling direction of the vehicle, in a two-dimensional domain of the relative distance versus the traveling velocity when an amount of variation in a Doppler velocity component of the vehicle with respect to the object present at the position away in the direction perpendicular to the travelling direction of the vehicle has reached a first reference value, and when the vehicle has traveled to a distance corresponding to the first reference value
wherein the first reference value is a resolution value of a Doppler velocity of the vehicle with respect to the object, and
the distance corresponding to the first reference value becomes longer as the resolution of the Doppler velocity is higher, or a position of the object present above the vehicle in the travelling direction becomes higher.

8. The radar signal processing method according to claim 7, further comprising;
determining whether the vehicle collides with the object present at the position away in the direction perpendicular to the travelling direction of the vehicle when a relative velocity between the vehicle and a nearby object present around the vehicle other than the object is different from the Doppler velocity component.

9. The radar signal processing method according to claim 8, further comprising:
in a case where the travelling velocity of the vehicle is lower than a reference velocity, and a difference between the relative velocity between the vehicle and the object and the Doppler velocity component is smaller than a threshold value, determining that the vehicle collides with the object when the amount of variation in the relative distance between the vehicle and the object over time is a monotonous decrease and the amount of the decrease in the relative distance is greater than or equal to a second reference value, and determining that the vehicle does not collide with the object when the amount of variation in the relative distance between the vehicle and the object is not a monotonous decrease or the amount of the decrease in the relative distance is less than the second reference value.

* * * * *